Jan. 16, 1951   J. J. RYAN ET AL   2,538,045
GUN MOUNTING

Filed April 2, 1943   6 Sheets-Sheet 5

INVENTORS
JOHN J. RYAN
DOUGLAS CLEGG
BY
their ATTORNEY

Jan. 16, 1951  J. J. RYAN ET AL  2,538,045
GUN MOUNTING

Filed April 2, 1943  6 Sheets-Sheet 6

INVENTORS
JOHN J. RYAN
DOUGLAS CLEGG
BY
Herbert H. Thompson
their ATTORNEY.

Patented Jan. 16, 1951

2,538,045

UNITED STATES PATENT OFFICE 2,538,045

GUN MOUNTING

John J. Ryan, Woodhaven, and Douglas Clegg, Great Neck, N. Y., assignors to The Sperry Corporation, a corporation of Delaware Application April 2, 1943, Serial No. 481,638

7 Claims. (Cl. 89—37.5)

This invention relates, generally, to gun mountings and particularly concerns turrets for mounting guns on aircraft.

Guns carried by aircraft must be adjustable about two independent axes, usually referred to as azimuth and elevation, in a manner such that they may be directed toward targets located in any part of a substantially hemispherical portion of space. In order to reduce the "drag" effect of such guns on the aircraft, they are mounted in a turret having an external contour designed aerodynamically to offer the least possible resistance. These turrets are mounted for adjustment about two independent axes to aim the guns. Usually an operator occupies a position within the turret and controls its movements relative to the aircraft to direct the line of sight of a sighting instrument onto a target. For heavier turrets, power mechanism is provided for driving the turret about two independent axes.

Since such turrets usually project from the "skin line" of the aircraft, it is desirable that their external dimensions be as small as possible, in order to offer the least possible wind resistance. However, the turret must be sufficiently large to contain an operator. These factors present a problem in arranging the equipment within the turret to make the operator most comfortable, as well as to provide for the most efficient operation of the turret in combat.

Although the design of automatic guns has progressed considerably, they are still subject to some defects such as jamming. For this and other reasons, it is desirable to have the firing and charging mechanisms of the guns accessible to the operator so minor repairs may be effected during flight. In order to have the guns accessible, they must be mounted within the turret.

It is possible to mount some of the equipment required for operation of the turret externally thereof. For example, ammunition may be carried externally of the turret and supplied to the guns within the turret. The present invention provides for carrying the ammunition externally and independently of the turret by feeding ammunition through the trunnions supporting the turret. A feeding mechanism is provided for forcing the ammunition through suitable guides into the turret. If the ammunition were mounted directly on the outer surface of the turret, it would be necessary either to enlarge a recess or "well" in the surface of the aircraft to provide for clearance of the ammunition container during rotation of the turret, or to reduce the size of the turret. Both of these arrangements are undesirable. Therefore, the ammunition is mounted independently of the turret.

Aircraft designs at the present time are such that the craft may travel at an altitude of many thousand feet. At high altitudes the atmospheric pressure is, of course, greatly reduced. In order to overcome the effects of this reduction in pressure on occupants of the aircraft, provision has been made for "pressurizing" cabins at the higher altitudes. This is accomplished by providing an air-tight cabin and increasing the pressure within the cabin.

Since the gun turrets on an aircraft are rotatable about two independent axes, the problem of pressurizing the turret (to increase the comfort of an operator located interiorly thereof) is complex. This problem is further complicated by the fact that the firing and charging mechanisms of the guns should be accessible to the operator, thus requiring that the guns project through the surface of the turret. Still another complication arises from the fact that it is desirable to carry the ammunition externally of the turret. Obviously, provision must be made for an air-tight turret including suitable seals for the various elements that pass through the surface of the turret including the driving elements which are controlled by the operator within the turret.

Since the turret is adjustable about two independent axes and may be rotated continuously in one direction about at least one of these axes, it is necessary to avoid twisting the various supply lines, such as those for conducting pressure, oxygen, electrical and communication lines to the turret.

Some portions of an aircraft project from the general surface outline, so it is necessary to provide a fire cut-off mechanism to eliminate the possibility of guns inadvertently hitting a projecting portion. This mechanism may also be used to avoid firing in any selected area such as that normally occupied by another aircraft or the path of bombs released by the craft on which the turret is mounted. Some arrangements heretofore suggested have provided for stopping the fire of all guns in the turret when any one of them might strike a projecting portion of the aircraft. This unnecessarily limits those guns in the turret which would not hit the projected portion of the aircraft. The present invention provides an independent fire cut-off for the spaced guns of the turret.

In the construction of the turret, one further factor which must be considered is the effect of the high wind velocity on the gun barrels projecting from the turret. One further difficulty which the present invention overcomes is the effect of flame at the muzzle of the gun in blinding an operator after firing each burst at a target. This is particularly true in night firing.

The main object of the present invention is to provide an aircraft gun turret that is not subject to the foregoing disadvantages.

One object of the present invention is to provide a pressurized gun turret having the gun mechanism accessible to an operator within the turret.

Another object of the invention is to provide a gun mounting with an improved feeding mechanism for supplying ammunition from a remote point.

A further object of the invention is to provide a pressurized turret in which the ammunition is fed from containers externally of the turret to guns carried within the turret.

A still further object of the invention is to provide an improved fire-cut-off mechanism whereby spaced guns in the turret are controlled independently.

Another object of the invention is to provide a pressurized turret with means which prevents firing of the last shell of ammunition, thereby avoiding the loss of pressure through a gun barrel.

A further object of the invention is to provide a device for connecting a plurality of supply lines to the turret without twisting them during rotation of the turret.

A further object of the invention is to provide means for protecting the gun barrels against the effect of high wind velocity.

A still further object of the invention is to provide a device for reducing the flame appearing at the muzzle of the guns.

Other objects and advantages of the invention will become apparent from the following description taken in connection with the accompanying drawings, wherein.

In order to simplify the drawings and to avoid obscuring important features of the invention, structural and reinforcing details of the turrets shown in the drawings have been eliminated. The turret shown in the drawings embodying applicants' invention is carried in a well, the side of which is indicated at 1, formed in the surface 2 of an aircraft.

A main support 3 is mounted rigidly with the sides 1 of the well and has an internal ring gear 4 formed on its interior. The support 3 is also formed with tracks adapted to engage vertical rollers 5, 5 and thrust rollers 6 (Fig. 2) carried by a supporting ring 7 for the turret that is rotatable on the support 3 about a vertical axis. This rotation is referred to as the azimuth rotation of the turret.

The supporting ring 7 carries a pair of hollow trunnions 8 and 9 which form an air-tight seal at 11 with the supporting ring 7. The trunnions 8 and 9 are formed with openings 12 and 13, around which are mounted trunnion bearings 14 and 15 for supporting the ball structure 16 of the turret as by bearings 17 and 18. It will be apparent that the turret 16 is rotatable about the horizontal axis of trunnion bearings 14 and 15 to provide an elevation adjustment therefor.

The turret shown in the drawings carries four guns, 21, 22, 23 and 24, having their barrels 31, 31 projecting through the surface of the turret. The turret is substantially spherical in shape, although the exact contour of various portions may be altered, as shown in the drawings, to provide better openings for the apparatus and for better sighting by the operator. Substantially the entire lower portion of the ball is protected by armor plate, whereas the upper portion may be of armored glass to provide a maximum view for the operator. A sighting panel 29 of armored glass may be flat, in order to avoid aberrations that might result from a curved sighting panel.

Figure 3:
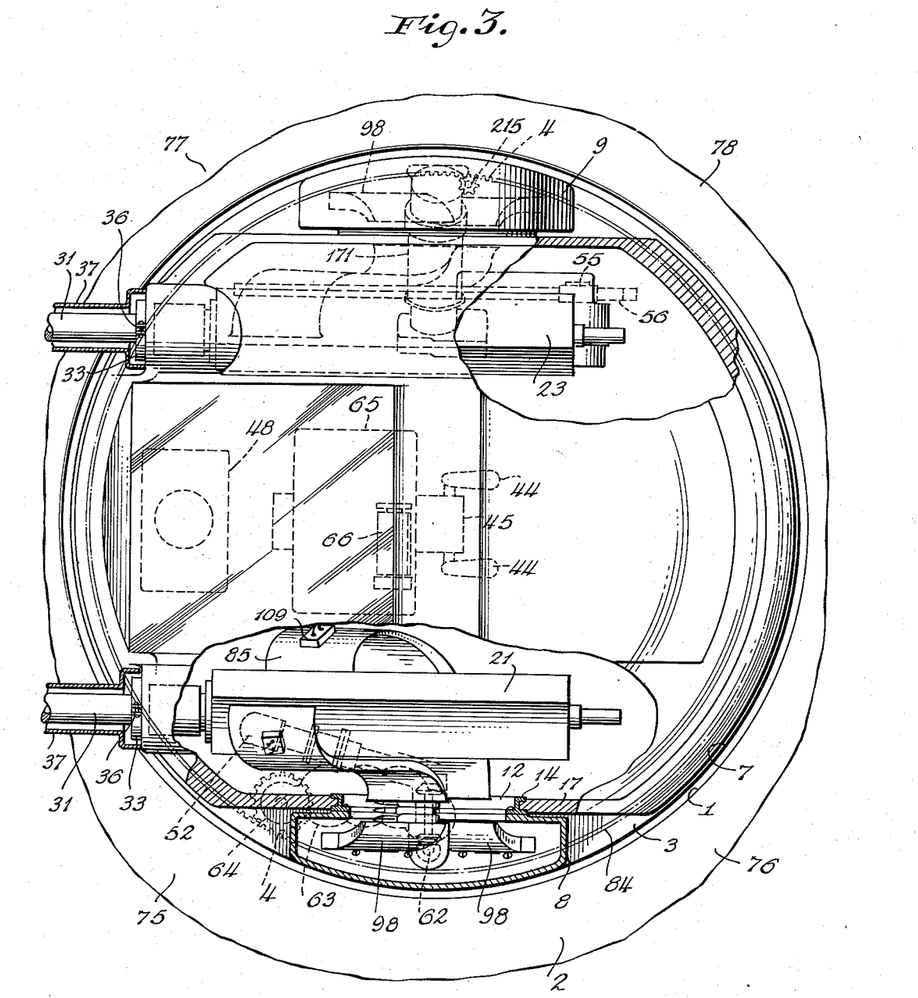
Fig. 3 is a top plan view of a turret with some portions broken away for purposes of clearness.
Figures 5, 7, 10:
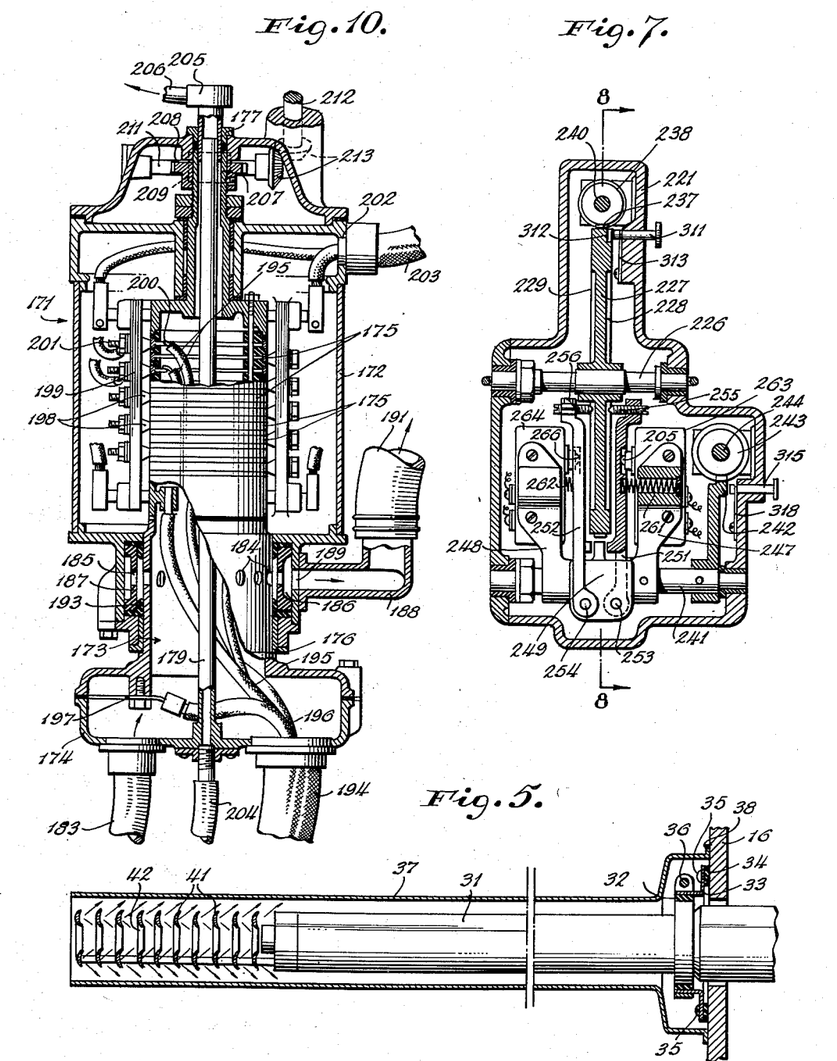
Fig. 5 is a sectional view of one embodiment of the invention for protecting the gun barrels against the effect of wind and for reducing the flame at the muzzle of the guns.
Fig. 7 is a vertical section through the fire cut-off mechanism.
Fig. 10 is a section through the longitudinal axis of the collector device shown mounted on the turret in Figs. 1 and 3.

As shown most clearly in Figs. 3 and 5, the gun barrels 31, 31 are sealed to the surface of the turret 16 by a sealing member 32, such as a resilient washer. The rubber washer 32 is fitted tightly to the gun barrel by a clamp 33 that is fixed to the surface of the turret 16 as by a suitable sealing member or resilient washer 34 which is held in place by bolts 35, 35. A suitable bolt 36 may be provided for adjusting the tension of the clamp 33.

Figure 2:
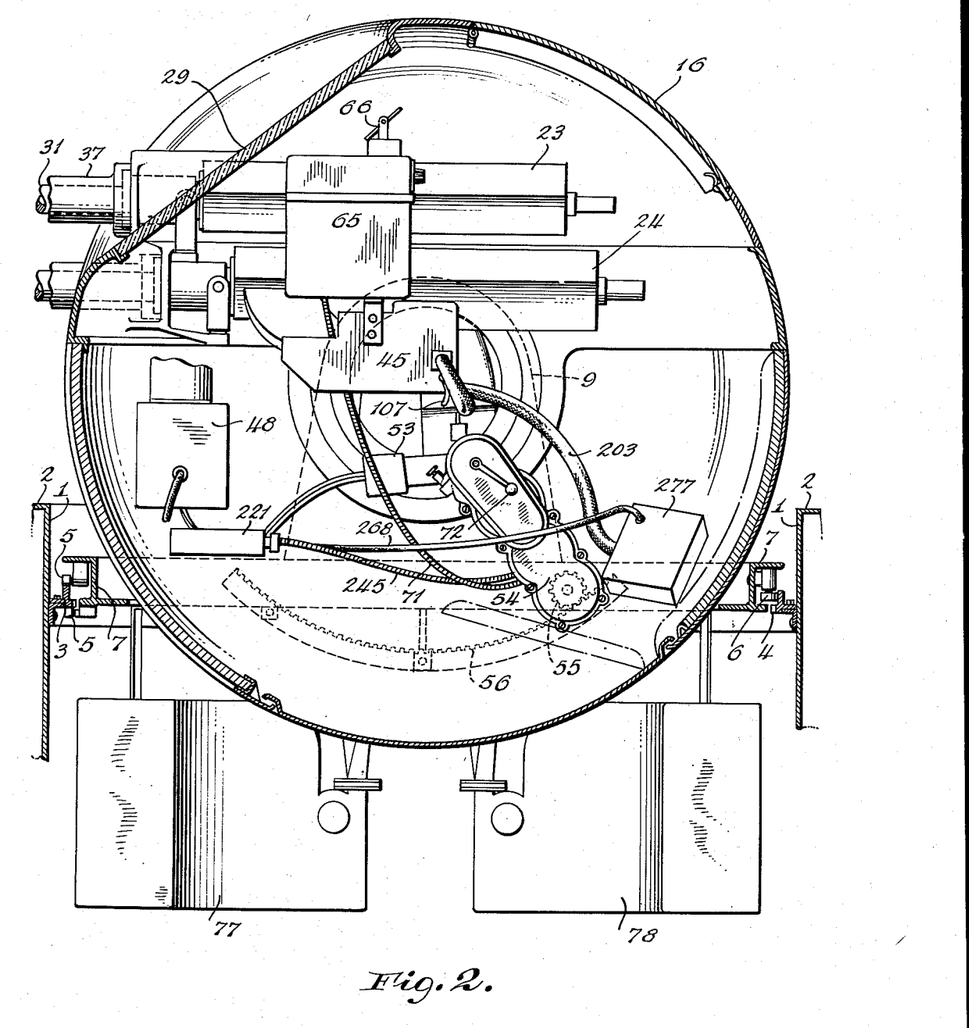
Fig. 2 is a side elevation view of a turret with some portions broken away for purposes of clearness to show the interior.

As shown in Figs. 2, 3 and 5, a wind protector 37 surrounds the gun barrel 31 and is spaced therefrom. The protector 37 is mounted directly on the turret 16 as by a flange 38 which may be welded or otherwise secured to the surface of the turret. Since the protector 37 is carried directly by the turret 16, high wind velocities may deflect the protector 37 but will not affect the gun barrel 31. It has been found that the high velocities of present day aircraft cause a material bending of the gun barrels projecting from the surface of the craft, thereby causing inaccuracies in firing the guns. It is the purpose of the protector 37 to absorb the wind effects without causing a deflection of the gun barrel.

Flashes due to burning gases following the expulsion of a projectile from the bore of a gun tend to blind the operator who is sighting along a line parallel to the gun barrel. This blinding of the operator makes it impossible for him to see the target following a burst from the guns. This results in his sights straying and causing "misses." In order to reduce these flashes and also to reduce the recoil of the gun, a series of discs 41, 41 are supported in spaced relation and in alignment with the gun barrel 31. The discs 41, 41 are each formed with an aperture 42 which may be aligned with the bore of the gun to permit passage of a projectile. Gases following a projectile through the apertures 42 are deflected away from the gun bore and their direction is substantially reversed. As these gases burn, the explosive force is reversed and does not add to the recoil of the gun but rather subtracts therefrom. Furthermore, at least a portion of the gases burn within the wind protector 37 so the flame visible to the operator is substantially reduced. The recoil and flame-reduction discs thus act to eliminate the blinding effect of burning gases on the operator's vision, as well as to reduce the possibility of detection by an enemy at night.

An operator located within the turret 16 controls suitable power mechanism for rotating the turret on trunnions 8 and 9 to aim the guns in elevation, and also suitable mechanism for rotating the ring 7 on the support 3 about a vertical axis to aim the guns in azimuth. These controls are actuated by suitable hand grips 44, which operate suitable devices within a control box 45 to control the above-mentioned driving mechanisms. The hand controls 44 may be of any suitable type, such as those in which elevation movements are effected by moving the grips about a horizontal axis, and azimuth movements are effected by turning the grips as a unit about the vertical axis.

The control box 45 may produce signals which can be transmitted as by leads 46 and 47 to the azimuth and elevation end of a suitable variable speed hydraulic transmission or control system 48. The signals supplied by leads 46 and 47 adjust the output of hydraulic pumps in the system 48, which supply pressure fluid through conduits 49 and 51 to azimuth and elevation motors 52 and 53, respectively.

The elevation motor 53 drives through suitable gearing within a casing 54 (Fig. 2) to rotate a pinion 55 that meshes with a sector gear 56 that is carried by the supporting ring 7. Thus, pressure fluid flowing through the conduit 51 operates the hydraulic elevation motor 53 to drive the pinion 55 to rotate the turret 16 about the horizontal axis of the trunnion 8, thereby adjusting the elevation angle of the guns.

Figure 1:
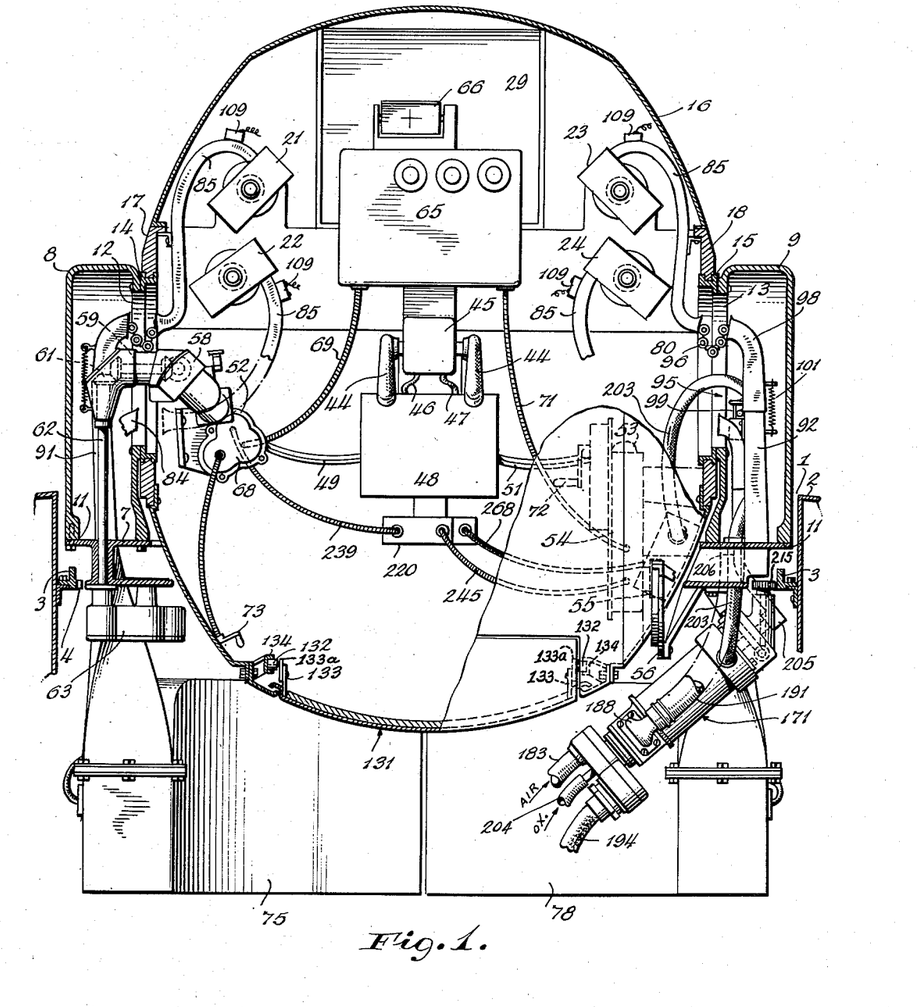
Fig. 1 is a rear elevation view of a turret with some portions broken away to show the interior.
Figure 4:
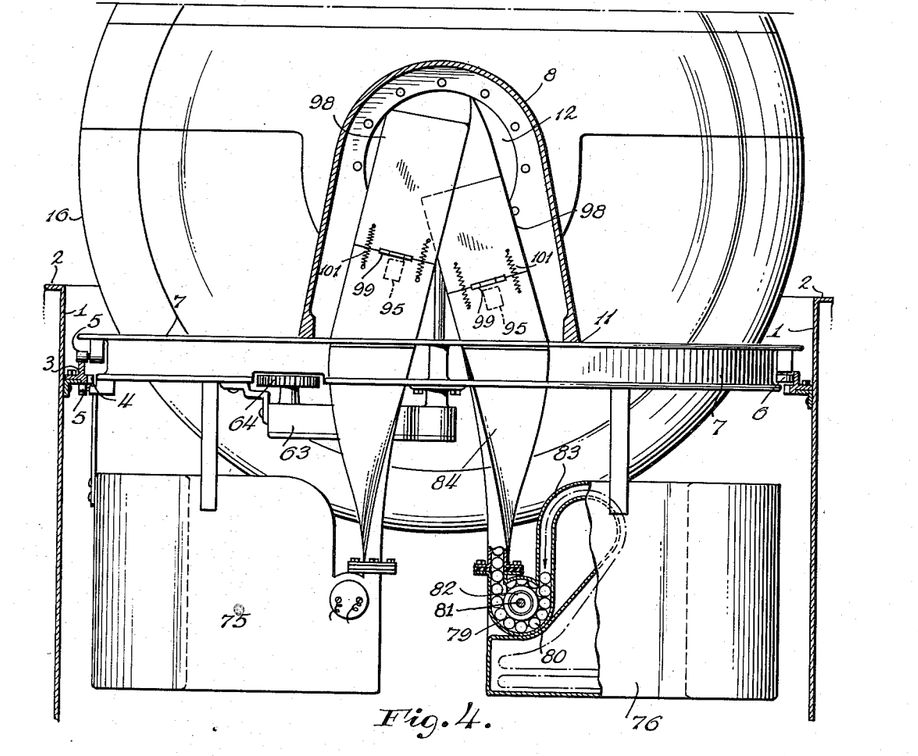
Fig. 4 is a partial side elevation view of a turret with parts of the trunnion broken away to show elements not appearing in Fig. 2.

The azimuth hydraulic motor 52 drives through shafting within the housing 58 (Fig. 1) to rotate a shaft 59, the axis of which is arranged along the horizontal axis of the trunnion 8. The shaft 59 drives through suitable gearing 61 to rotate a shaft 62 that drives the input to a gear box 63 (Figs. 3 and 4). The gear box 63 contains suitable reduction gears to drive an azimuth output gear 64 (Fig. 4), which is arranged to mesh with the internal ring gear 4 on the supporting member 3 to rotate the turret 16 about a vertical axis, thereby adjusting the guns in azimuth.

The turret shown in the drawings has a device known as a computing sight 65, which utilizes gun azimuth and elevation data to off-set the line of sight of an optical member 66 to provide the necessary lead angles to direct the fire of the guns against desired targets. The azimuth gun data is supplied from a gear box 68 driven by the azimuth motor 52, through a suitable flexible shaft 69. The gun elevation data is supplied from the gear box 54 driven by the elevation motor 53, through a suitable flexible shaft 71.

In the event the power mechanism is driving the turret and elevation and azimuth becomes inoperative, provision is made for manually moving the turret by rotating hand wheels 72 and 73 which drive into the elevation and azimuth gear boxes 54 and 68, respectively, to move the turret in the same manner as the elevation and azimuth motors.

For additional details of suitable power driving controls and a computing sight, reference may be had to copending application Serial No. 480,572, for Stabilized Computing Gun Sight, filed March 25, 1943, in the name of E. B. Hammond, Jr.

The ammunition for the guns is carried in four ammunition containers 75, 76, 77 and 78, which are supported beneath the ring 7 and extend around substantially the entire circumference. In this manner, maximum utilization is obtained of the available space so a maximum quantity of ammunition may be carried for each of the four guns. It might be said that the ammunition for each gun is carried in a quadrant of the ring of containers. This is shown clearly in Fig. 4 wherein the side of container 76 is broken away to show the ammunition belts 80 arranged therein.

The ammunition is fed from the container 76 through a passage 83 forming a portion of the container, and around a sprocket 79 which is driven by a suitable motor 82 that is contained within the sprocket. The sprocket and motor are supported in the container by a shaft 81. The belts 80 of ammunition are forced by rotation of the sprocket 79 into a guide 84 which twists the ammunition about a vertical axis. The guide 84 extends through the ring 7 forming an airtight seal therewith, whereby pressure within the trunnion 8 is not effected by a change in pressure externally of the turret. The ammunition belt 80 in the guide 84 is then fed through the opening 12 into the interior of the turret 16. The guide 84 may terminate at the opening 12 and a flexible guide 85 may be utilized to form a passage for the ammunition belt to the gun 22. The feeding motor 82 is controlled in accordance with the tension of the ammunition belt 80 in the guide 84, as will subsequently appear.

The guns 21, 23 and 24 are similarly supplied with ammunition through guides 91, 92 and 93 into which the belts are forced from the ammunition containers to the respective guns. Each of the ammunition containers is provided with a feeding motor and sprocket similar to the motor 82 and sprocket 79 described in connection with the container 76. Each of these motors is controlled by a switch 95 that is actuated in accordance with the tension of the ammunition belt 80.

An upper portion 98 (Fig. 1) of the guide 92 is connected to the guide 92 by a hinge 99, whereby it may be swung against the tension of springs 101 which normally hold the upper portion 98 in alignment with the guide 92. An increase in the tension of the ammunition belt 96 causes the upper portion 98 to move laterally relative to the guide 92. This movement closes the switch 95 to energize the feeding motor in the ammunition container 77 which is identical with the motor 82. As the tension of the ammunition belt increases, the motor forces more ammunition into the guide 92, thereby reducing the tension. The springs 101 may be adjusted so any desired amount of tension for the belt 96 will cause the feeding motor to be energized.

A trigger 107 is provided on one of the grips 44 for closing the firing and charging circuits of all of the guns and causing all of them to fire. The trigger and the firing circuits may be of any suitable and conventional design whereby the guns are automatically charged and fired as soon as the trigger 107 is depressed.

Figure 6:
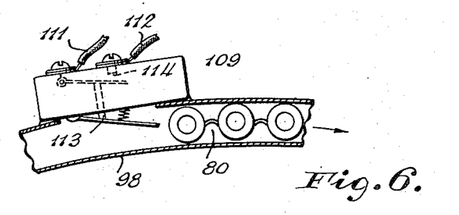
Fig. 6 is an enlarged sectional view of one of the ammunition guides showing a low ammunition cut-off switch.

In order to prevent the last shell of the ammunition belt from being fired, a switch 109 (Fig.

6) is mounted on each of the flexible ammunition guides 85 within the turret and is arranged to be opened (as shown in Fig. 6) upon passage of the last round of ammunition through the guide. The switch 109 is connected in the power supply for the firing and charging circuit for its particular gun. The switch 109 may be of any conventional design in which a spring-pressed plunger 113 is moved to open the switch contacts 114 upon passage of the last round of ammunition in the belt 80.

It is necessary that some means be provided for sealing the barrels of the guns in order to maintain the pressure within the turret. Tests have proven that the presence of a shell in the breech forms a sufficient seal. By preventing the guns from firing at least the last round of the ammunition, the pressure is maintained by retaining a projectile in the breech of each of the guns.

Figure 8:
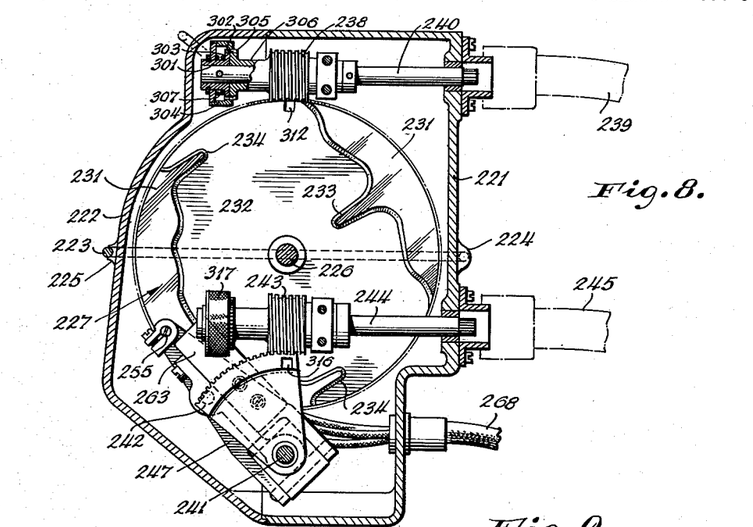
Fig. 8 is a section through the fire cut-off mechanism taken on the line 8—8 of Fig. 7.

In order to avoid the possibility of firing the guns when they are directed toward a projecting portion of the aircraft, a fire cut-off mechanism, as shown in Figs. 7 and 8, is provided for opening the firing circuits of the guns 21 and 22 when they are directed toward a projecting portion of the craft, and for independently opening the firing circuits of the guns 23 and 24 when they are directed toward a projecting portion of the craft. This mechanism comprises a main casing 221 which has a cover 222 adapted to be fitted on the casing and held by a bail 223 pivotally mounted on the casing 221 at 224. A catch, in the form of a notch 225, is provided on the cover 222 for holding the bail in place when the cover is closed.

A shaft 226 is journalled in the casing 221 and carries a double-faced disc cam 227 having cam surfaces 228 and 229 on each of its faces. These cam surfaces each have raised portions 231 and recessed portions 232. The raised portions represent projecting portions of the aircraft toward which the guns may be directed, for example, the tail assembly including the rudder which may be represented by a peak 233, and the forward portions of the plane, including the propellers and the wings. The wing tips may be represented by peaks 234 of the raised portions 231. The surfaces of the two cam faces 228 and 229 are substantially identical. However, the positions of the raised portions are angularly displaced on the two faces by an amount dependent upon the distance from the guns 21 and 22 to the guns 23 and 24 in the turret. For example, the cam surface 228 may be arranged so the peak 233 will cut-off the fire of the guns 23 and 24 when they are directed toward the rudder of the aircraft. At this time, however, the guns 21 and 22 may continue firing. Similarly, when the guns 21 and 22 are directed toward the rudder their fire is cut-off but the guns 23 and 24 may continue firing. The manner in which this firing is controlled will appear from the following description of the firing cut-off mechanism.

The disc 227 has a worm wheel 237 formed on its periphery and arranged to mesh with a worm gear 238 on a shaft 240 that is driven by flexible shaft 239 extending from the azimuth gear box 68 to the fire cut-off mechanism (Fig. 1) in accordance with the azimuth position of the turret 16. It will be apparent that the cam disc 227 is thereby rotated in accordance with the azimuth position of the guns. One revolution of the turret 16 in azimuth causes one revolution of the cam disc 227.

A shaft 241 carries a worm wheel sector 242 in mesh with a worm gear 243 that is mounted on a shaft 244. Shaft 244 may be splined to and driven by flexible shaft 245 extending from the elevation gear box 54 to the fire cut-off mechanism. The shaft 245 is driven in accordance with the elevation of the turret 16 and drives through shaft 244, worm gear 243, and sector 242, to position the shaft 241 in accordance with the elevation position of the guns. Shaft 241 carries twin arms 247 and 248 which are adapted to swing on opposite sides of the disc 227 in an arc across the surfaces of the cam faces 228 and 229, respectively.

The twin arms 247 and 248 include a main body portion 249 which surrounds the shaft 241 and is fixed thereto. The main body 249 carries a pair of cam followers 251 and 252 pivotally mounted at 253 and 254 on the main body 249. The followers 251 and 252 carry cam follower pins 255 and 256, respectively, which are adjustable in the followers 251 and 252 to engage, or to ride on, the cam surfaces 228 and 229. The cam follower pins 255 and 256 are resiliently held in engagement with the cam surfaces by compression springs 261 and 262 inserted between the arms 247 and 248 and the followers 251 and 252, respectively. The arms 247 and 248 carry suitable electrical switches 263 and 264 having plungers 265 and 266 in engagement with the followers 251 and 252. These plungers are so arranged that the switches are closed when the cam pins are riding over the recessed portions 232 of the cam surfaces 228 and 229, and are open when the cam follower pins are in engagement with the raised portions 231 thereof.

From the foregoing description it will be apparent that the cam disc 227 is rotated in accordance with the azimuth position of the guns. The cam follower arms 251 and 252 swing in an arc across the cam surfaces in accordance with the elevation position of the guns.

The raised portions 231 of the cam are so arranged that when the elevation and azimuth positions of the guns are such as to direct the guns toward a projecting portion of the aircraft, the cam pins will be in engagement with raised portions, thereby depressing the plungers 265 and 266 to open switches 263 and 264. Electrical connections from the switches 263 and 264 extend to a cable 268 which connects them to the firing circuits of the guns. As previously explained, the firing circuits of the guns on one side of the turret are controlled by the cam surface 228, whereas the guns on the other side of the turret are controlled by the cam surface 229. Angular displacement of the cam surfaces 228 and 229 is provided so their contours cause movement of the cam follower pins 255 and 256 only when their respective guns are directed toward a projecting portion of the aircraft. Thus, independent fire cut-off control for the spaced guns is provided.

When the fire cut-off mechanism is first installed in a turret, it is necessary to adjust the cams 227 and the twin arms 247 and 248 so their positions conform with the positions of the guns. Once this adjustment is effected the elements of the fire cut-off mechanism will follow movements of the turret and the guns. Further adjustments are only necessary if the connections between the fire cut-off mechanism and the guns are broken either by accident or in removing some portion of the fire control system.

The shaft 240 is keyed to a collar 301 having gear teeth 302 cut in a flange 303 and adapted to engage teeth on the interior of an adjustment knob 304. The teeth on the interior of adjustment knob 304 also are normally held by a spring 307 in engagement with a gear 305 on sleeve 306 which is integral with the worm gear 238. By this arrangement, rotation of the shaft 240 drives the worm gear 238. The exterior of the adjustment knob 304 may be knurled to form a suitable hand grip.

A pin 311 (Fig. 7) is adapted to engage a notch 312 milled in the surface of the cam disc 227 but is normally disengaged from the slot by the action of a leaf spring 313.

When the fire cut-off mechanism is first installed, the guns are positioned at a certain azimuth angle. This angle is selected to agree with the angle at which the pin 311 will engage the notch 312. The operator then presses the pin 311 and moves the knob 304 to disengage teeth 302. He then rotates the knob and worm gear 238 independently of the shaft 240 to turn the cam disc 227 until the pin 311 drops in the notch 312. The knob 304 and the pin 311 are then released. When this is done the worm wheel on the cam disc is locked to the shaft 240 and will turn only in response to azimuth movements of the gun, as determined by rotation of the flexible shaft 239.

The elevation worm gear 243 is driven by the shaft 244 in the same manner as that described in connection with the worm gear 238. A pin 315 projecting from the casing is arranged to engage a slot 316 formed in the sector 242 when the twin arms are arranged in a given elevation position.

In setting the elevation of the fire cut-off mechanism the guns are positioned at a certain elevation angle. Adjusting knob 317, similar to knob 304, is then depressed and rotated to drive the sector 242 independently of the shaft 244 until the pin 315 drops into the notch 316. The pin and the knob 317 are then released, whereby the sector is locked to the shaft 244. A spring 318 is provided for normally holding the pin 315 out of engagement with gear sector 242.

From this description it will be apparent that the fire cut-off mechanism includes devices which are positioned in accordance with the azimuth and elevation of the guns. Manually operated knobs 304 and 317 may be used in conjunction with pins 311 and 315 to set these devices in accordance with certain azimuth and elevation positions of the guns, after which the devices will continually follow azimuth and elevation movements of the guns.

Figure 9:
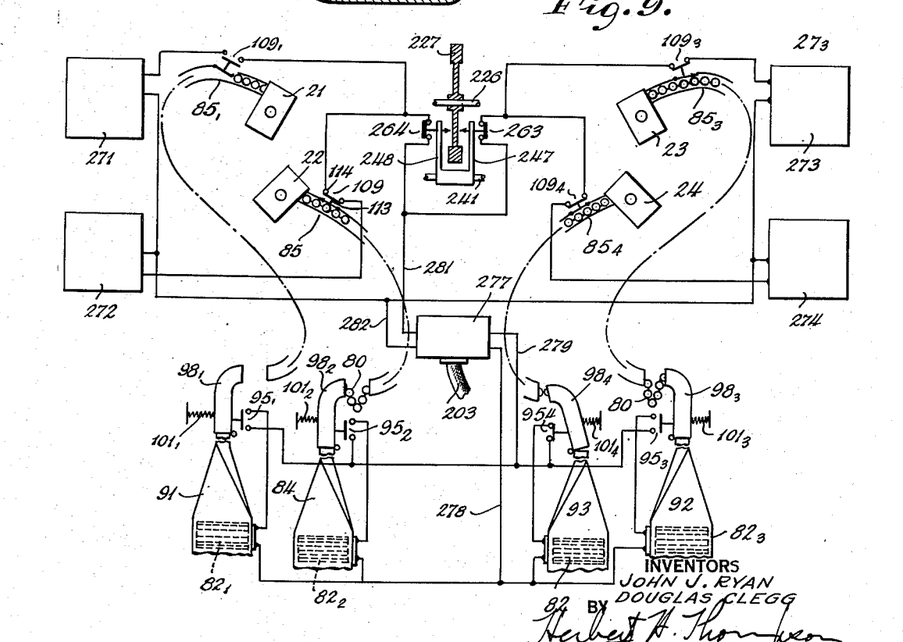
Fig. 9 is a wiring diagram showing the circuits of the ammunition and fire control switches.

Referring now to the wiring diagram shown in Fig. 9, the firing and charging circuits for the guns 21, 22, 23 and 24 are represented schematically by boxes 271, 272, 273 and 274, respectively. Ammunition guides for the guns are partially shown and are designated 91, 84, 92 and 93, respectively. The upper hinged portions of these ammunition guides are designated $98_1$, $98_2$, $98_3$ and $98_4$, respectively. The flexible ammunition guides from the trunnions to the guns are designated $85_1$, $85$, $85_3$ and $85_4$, respectively, and are shown as having low ammunition cut-off switches $109_1$, $109$, $109_3$ and $109_4$, respectively.

A schematic representation of the fire cut-off mechanism is shown as including the cam disc 227 on shaft 226 and having switches 263 and 264 carried by arms 247 and 248 on the shaft 241.

Power input from a cable 203, extending into the turret from the collector 171, terminates in a junction box 277. Power from the junction box 277 is supplied to feeding motors $82_1$, $82_2$, $82$ and $82_3$, respectively, by a lead 278 which is connected directly to the motors and a lead 279 which is connected through switches $95_1$, $95_2$, $95_3$ and $95_4$ arranged to be operated by the hinged portions $98_1$, $98_2$, $98$ and $98_4$, respectively.

As has been previously explained, the hinged portions are normally resiliently held in their upright or vertical positions and are adapted to be moved laterally about the hinges by an increase in the tension of ammunition belts 80 extending between the hinged portions 98 and the flexible guides 85. When this occurs, the switch is closed, as shown by the switch $95_4$ in Fig. 9. In this case the tension of the ammunition belt supplying ammunition to the gun 24 has increased, thereby moving the upper portion $98_4$ against the action of the spring $101_4$ to close the switch $95_4$. This energizes a motor 82 until sufficient ammunition is forced into the guide 93 to eventually form a bight in the ammunition belt as shown for the guns 22 and 23.

The firing and charging circuits 271, 272, 273 and 274 are controlled jointly by the switches in the fire cut-off mechanism and by the switches 109 in the flexible ammunition guides 85. For example, the ammunition belt to the gun 21 has passed the switch $109_1$ which is now open. This opens the circuit including lead 281 from the junction box 277, thereby cutting off the supply of energy to the firing circuit 271.

The energy supplied to the junction box 277 is connected by leads 281 and 282 to the firing and charging circuits of the various guns. The lead 281 is connected first through the switches 263 and 264 of the firing cut-off mechanism.

When the cam follower pins 255 and 256 are over the lower portions of the cam surfaces 228 and 229, the switches 263 and 264 are closed. This completes the circuit as far as the low ammunition cut-off switches 109. If, however, the last round of ammunition has passed the low ammunition cut-off switches 109, the firing circuits for the particular guns cannot be energized. If the guns 21 and 22 are directed toward a projecting portion of the craft, the switch 264 will be open as the follower in the arm 248 rides upon the raised portion of the cam surface 229. This cuts off the firing circuits 271 and 272 for both of the guns 21 and 22. However, the guns 23 and 24 may not be directed toward a projecting portion of the craft, in which case the switch 263 will remain closed as the follower carried by the arm 247 remains over a recessed portion of the cam surface 228. In this manner, energy continues to be supplied through the low ammunition cut-off switches to the firing and charging circuits 273 and 274. However, if one or both of these guns should run low in ammunition, passage of the last round of ammunition by the switches $109_3$ and $109_4$ would stop the supply of energy to one or both of the firing and charging circuits 273 and 274.

It will be apparent that ammunition is forced into the guides by the feeding motors 82 in accordance with the supply required by the guns, as determined by the tension of the ammunition belts in the guides. When the ammunition becomes exhausted there is, of course, no tension, whereby the upper portions 98 are moved to the upright positions by springs 101. This opens the switches 95 removing energy from the feeding motors.

There are two controls for the firing and charging circuits of each of the guns. The first of these controls is that of the fire cut-off mechanism. The second is that of the low ammunition cut-off switch.

An access door 131 is slidably mounted by rollers 132, 132 on sliding link arms 133, 133a for permitting the operator to enter the turret. The rollers are carried by curved tracks 134 and 135 that are supported by the turret. The door is tightly fitted to the surface of the turret to form an air-tight seal therewith. In opening the door, it is first lifted upon sliding links 133, 133a, to clear the opening in the turret. It is then moved along tracks 134 and 135 within the turret to its open position.

In order that the turret may be supplied with air, oxygen, and electrical lines, without causing twisting of the cables during rotation of the turret, a suitable collector 171 is carried by the ring 7. The details of this collector are shown most clearly in Fig. 10. The collector 171 comprises a casing 172 which is rigidly clamped or fastened to the ring 7. A hollow rotatable cylinder 173, including an input head 174 and a plurality of electrical slip rings 175, 175, is carried by the casing and is rotatable in bearings 176 and 177. The cylinder 173 carries a tube 179 that extends from the head 174 through the opposite end 181 of the casing and is rotatable with the cylinder.

Air pressure is introduced from a suitable flexible hose 183 into the head 174, and travels through the cylinder 173 to a plurality of apertures 184, 184, which are aligned with openings 185 in recess 186 formed in an annular member 187 arranged between the cylinder 173 and the casing 172. A suitable coupling 188 is mounted on the casing 172 and is in communication with the recess 186 through an aperture 189. Air pressure is thus supplied from the hose 183 through the cylinder to the coupling 188 and thence by a suitable hose conduit 191 to the interior of the turret 16. The hose 191 may be connected through the ring 7 to the interior of the trunnion 9. Since the interior of the hollow trunnion 9 is air-tight with the interior of the turret, the air pressure thus introduced is also supplied to the turret. Although the bearings 176 form a substantially air-tight fit between the cylinder 173 and the casing 172, suitable packing 193 may be provided to prevent escape of air from the recess 186.

An electrical cable 194 containing a plurality of leads 195, 195 is also connected to the head 174. The cable carries the leads from a point in the aircraft to the head 174. These leads may supply electrical power from a suitable source in the aircraft, radio and communication signals and other electrical energy, from various points in the aircraft. One common or ground lead 196 is fastened as at 197 directly to the body of the cylinder 173. The other leads 195 are connected in a suitable manner, as at 200, to the various slip rings 175. Each of the slip rings has a corresponding brush 198 which is mounted rigidly with the casing 172. The brushes are connected to a suitable terminal strip 199, which includes a plurality of terminals 201, 201. Leads are connected from the terminals 201 through an opening 202 in the casing into a cable 203 which carries them through an air-tight connection in the ring 7 and into the turret. In this way rotatable connections are provided between the conductors in cables 194 and 203.

A flexible tube 204 from a suitable source, such as an oxygen container, may be connected from any point in the aircraft to the lower portion of the tube 179, which is rotatable with the cylinder 173. The upper portion of the tube 179 is connected to a rotatable coupling 205. A flexible tube 206 is connected from the outlet of the coupling through an air-tight seal in the ring and into the turret providing a rotatable fluid connection with tube 204.

The size of the upper portion 207 of the cylinder 173 is reduced to form a hollow shaft, surrounding the tube 179, for a worm wheel 208. A worm gear 209 is carried in engagement with the worm wheel 208 by a shaft 211 which is driven from the shaft 212 through suitable gearing 213. The shaft 212 projects through the upper portion of the casing 172 and carries a pinion 215 in mesh with the internal ring gear 4.

The collector 171 is mounted rigidly to the ring 7, so rotation of the ring and turret in azimuth (about the vertical axis) causes rotation of the pinion 215. This drives through the shafts 212 and 211 and the worm gear 209 and worm wheel 208 to rotate the cylinder 173 relative to the casing 172. The size of the pinion 215 and the ratio of the worm gear 209 to the worm wheel 208 is chosen so that the cylinder will make one complete revolution relative to the casing 172 for each complete revolution of the ring 7 relative to the support 3 and in the opposite direction. Since rotation of the turret relative to the support causes a corresponding rotation of the cylinder 173 relative to the turret, the cylinder remains substantially stationary relative to the support 3.

It will be aparent, therefore, that the hose connections 183 and 204, as well as the electrical cable 194, do not rotate relative to the aircraft, although the turret rotates about a vertical axis. This arrangement avoids twisting of the hose connections and the cable during the azimuth movements of the turret and permits the turret to continuously rotate in one direction about a vertical axis without endangering the hose connections or the cable. Although only one connection has been shown for air, oxygen, and the electrical conductors, additional connections may be made to the head 174 without departing from the invention.

In operation, the operator located within the turret aims the guns by controlling hand grips 44 to drive the turret in azimuth and elevation by motors 52 and 53. As has been explained, this control may be of any suitable conventional type, or may be a stabilized control such as that illustrated and described in the above-mentioned copending application Serial No. 480,572.

The azimuth motor 52 drives the turret in azimuth by rotating the supporting ring 7 relative to the support 3. The elevation motor 53 drives the turret about the horizontal axis of the trunnion to adjust the elevation position of the guns. Ammunition containers are mounted with the supporting ring 7 and rotate in azimuth with the turret. Ammunition from these containers is forced by feeding motors 82, controlled by switches 95, into suitable guides which form a passage from the ammunition containers through the hollow trunnions. The feeding mechanism is controlled in accordane with the tension of the ammunition belts in the guides. Suitable ammunition belts must be provided which may be twisted to permit rotation of the turret in elevation relative to the containers and ammunition guides.

The elevation and azimuth positions of the turret are supplied to a computing gun sight 65 which adjusts the line of sight defined by optical member 66. When the line of sight is on a target the operator depresses the trigger 107 to fire the guns.

The firing circuits are controlled by the fire cut-off mechanism 220 to prevent hitting projecting portions of the plane. These firing circuits are further controlled by the switches 109 to open the firing circuits as the last round of ammunition passes the switches. This action prevents firing of the last round of ammunition from the guns and retains a shell in the breech thereof, thus avoiding loss of pressure through the gun barrel.

In order to supply compressed air, oxygen, and the required electrical connections to the turret from suitable sources within the aircraft, the collector 171 provides a rotatable connection for each of these connections, whereby the input remains stationary relative to the plane and the output remains stationary relative to the turret, even though the turret may rotate continuously in azimuth relative to the plane.

Although the drawings and the foregoing description mainly concern a turret that is located in the upper portion of the fuselage of an aircraft, it should be understood that it is contemplated that the subject matter of the invention may be included in gun mountings of any type, such as turrets located in the lower portion, tail, or nose of the fuselage. Some features of the invention are equally applicable to other types of gun mountings, as well as those for supporting guns on aircraft.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A gun mounting comprising a support, a pair of hollow trunnions on said support, a substantially air-tight turret carried by said trunnions for adjustment relative to said support, a gun carried by said turret and projecting through the surface thereof, an ammunition container arranged externally of said turret, means including substantially air-tight guides for supplying ammunition from said container through said trunnions to said gun, and means for applying air pressure to said turret, said passage and said container.

2. A gun mounting comprising a support, a ring rotatable on said support, a pair of hollow trunnions on said ring, a substantially air-tight turret carried by said trunnions for adjustment about two independent axes relative to said support, at least one gun supported in said turret and projecting through the surface thereof, an ammunition container carried by said ring, means including a substantially air-tight passage for supplying ammunition from said container through said trunnions to said gun, and means for applying air pressure to said turret, said passage and said container.

3. A gun mounting comprising a support, a ring rotatable on said support, a pair of hollow trunnions on said ring, a turret carried by said trunnions for movement about two independent axes relative to said support, a plurality of guns supported in said turret and projecting through the surface thereof, a plurality of ammunition containers carried by said ring and arranged about substantially the entire circumference thereof, and means for supplying ammunition from said containers through said trunnions to said guns.

4. A gun mounting comprising a support, a ring rotatable on said support, a pair of hollow trunnions on said ring, an airtight turret carried by said trunnions for movement about two independent axes relative to said support, a plurality of guns supported in said turret and projecting through the surface thereof, a plurality of ammunition containers carried by said ring and arranged about substantially the entire circumference thereof, means including substantially airtight passages for supplying ammunition from said containers through said trunnions to said guns, and means for applying air pressure to said turrets, said passages and said containers.

5. A gun mounting comprising a substantially air-tight turret supported for adjustment about two independent axes and adapted to contain an operator, one of said axes containing a set of bearing supports forming part of an air-tight seal to said turret, a gun having its firing mechanism arranged within said turret and accessible to the operator, feeding mechanism including substantially air-tight guides for supplying ammunition from a container arranged externally of and underneath said turret through said bearings to said firing mechanism, members under the control of the operator for adjusting said turret about said axes to aim said gun, means for applying air pressure to the interior of said turret and said container, and circuit control means including a switch for said feeding mechanism, said switch being normally closed by engagement with ammunition in said guide and being adapted to be opened upon passage of the last round of ammunition to open said circuit preventing firing of the last shell, thereby preventing escape of air through the gun barrel.

6. In a pressurized gun turret supported for adjustment about two independent axes, one of said axes containing a set of bearing supports forming part of an airtight seal to said turret, a gun projecting through the surface of the turret, an ammunition container carried externally at the bottom of said turret, a substantially airtight passage for guiding ammunition into said turret through at least one of said supports, a feeding mechanism for forcing ammunition from said container through said passage to said gun, power means for said mechanism, circuit means including a switch controlling said power means, means for applying air pressure to said turret, said passage and said container, and an actuating member associated with said passage adapted to close said switch upon engagement with said ammunition and adapted to open said switch upon passage of the last round of said ammunition to open said circuit preventing firing of said round thereby preventing escape of air through the gun barrel.

7. A gun turret for aircraft adapted to retain air under pressure for high altitude operation comprising a substantially spherical air-tight body having a generally centrally located position for a gunner, means supporting the body for rotation about a horizontal axis comprising a pair of hollow trunnions provided with air-tight bearings attached to opposite sides of the body and communicating with the interior thereof, a supporting ring for the trunnions to which the trunnions are sealed supported by the aircraft for rotation about a vertical axis, a plurality of gun openings formed in the body, a plurality of guns in the turret symmetrically fixed to the body on opposite sides of the gunner's position having barrels protruding through said openings and sealed therein, means for displacing the turret about its axes to aim the guns comprising a pair of motors disposed in the body and controllable by the gunner, shaft and gear means extending through one of the trunnions driven by one of the motors for turning said ring, a gear sector fixed to the ring, and air-tight gear means driven by the other of the motors projecting through the body and meshing with the gear sector for turning the turret about its horizontal axis.

JOHN J. RYAN.
DOUGLAS CLEGG.

REFERENCES CITED

The following references are of record in the file of this patent:

UNITED STATES PATENTS

| Number | Name | Date |
|---|---|---|
| 1,461,700 | Nichols | July 10, 1923 |
| 1,553,992 | Dawson et al. | Sept. 15, 1925 |
| 1,555,026 | Rose | Sept. 29, 1925 |
| 1,651,699 | Halsey | Dec. 6, 1927 |
| 1,842,446 | Dabrasky | Jan. 26, 1932 |
| 1,901,138 | Barnes | Mar. 14, 1933 |
| 2,029,692 | Zindel | Feb. 4, 1936 |
| 2,231,149 | Baum | Feb. 11, 1941 |
| 2,233,918 | Fey | Mar. 4, 1941 |
| 2,237,833 | Lanciani | Apr. 8, 1941 |
| 2,287,104 | Joyce | June 23, 1942 |
| 2,291,071 | Bruno | July 28, 1942 |
| 2,304,566 | Haberlin | Dec. 8, 1942 |
| 2,329,308 | Trotter et al. | Sept. 14, 1943 |
| 2,336,557 | McCallister | Dec. 14, 1943 |
| 2,357,209 | Lanciani | Aug. 29, 1944 |
| 2,396,529 | Phillips | Mar. 12, 1946 |

FOREIGN PATENTS

| Number | Country | Date |
|---|---|---|
| 673,342 | France | Oct. 7, 1929 |
| 498,193 | Germany | May 20, 1930 |
| 573,167 | Germany | Mar. 28, 1933 |
| 800,959 | France | May 11, 1936 |
| 495,187 | Great Britain | Nov. 7, 1938 |
| 366,247 | Italy | Dec. 22, 1938 |
| 865,889 | France | Mar. 17, 1941 |